United States Patent

Frazier

[15] 3,684,763

[45] Aug. 15, 1972

[54] ACTIVATED CARBON BLACK PRODUCT

[72] Inventor: Arthur E. Frazier, Phillips, Tex.

[73] Assignee: Phillips Petroleum Company

[22] Filed: Jan. 22, 1971

[21] Appl. No.: 108,977

[52] U.S. Cl. ................................................260/37 R
[51] Int. Cl. .............................................C08g 51/08
[58] Field of Search......................260/37 R; 106/307

[56] References Cited

UNITED STATES PATENTS

| | | |
|---|---|---|
| 2,452,083 | 10/1948 | Te Grotenhuis.........260/37 R |
| 3,005,725 | 10/1961 | Daniell......................106/307 |
| 3,279,935 | 10/1966 | Daniell et al. .............106/307 |
| 3,524,835 | 8/1970 | Edmonds et al......260/37 R X |

Primary Examiner—Lewis T. Jacobs
Attorney—Young and Quigg

[57] ABSTRACT

Carbon black is pelleted in the presence of an arylene sulfide polymer followed by heating preferably with air and/or steam to produce a high strength substitute activated carbon. The arylene sulfide polymer ordinarily will be present in amounts ranging from 1 to 20 weight percent of the pelleted carbon black.

11 Claims, No Drawings

ACTIVATED CARBON BLACK PRODUCT

This invention relates to improved pelleted or beaded carbon blacks. In accordance with another aspect, this invention relates to the production of activated carbon blacks. In accordance with another aspect, this invention relates to the pelleting of carbon blacks in the presence of arylene sulfide polymers. In accordance with a further aspect, this invention relates to the pelleting of carbon black in the presence of polyphenylene sulfide and heating of the pellets under conditions to produce a pelleted product having high crush strength and high surface area. In accordance with still another aspect, this invention relates to activating carbon black pellets containing 1 to 20 weight percent polyphenylene sulfide with steam and/or air at an elevated temperature to produce a high strength substitute activated carbon having a surface area up to about 1,200 ($N_2SA$).

Activated carbon is an amorphous form of carbon having a very large surface area ranging from about 300 to 2,000 square meters per gram ($m^2/g$) and having a highly developed internal pore structure. Liquid phase activated carbons, e.g., decolorizing carbons, have relatively large internal pores and are often used in powder form. Gas phase or vapor adsorbent carbons have relatively small internal pores and are generally used in the form of hard dense pellets or granules. Adsorptive property for liquids is conveniently indicated by methylene blue adsorption values and adsorptive property for gases is conveniently indicated by carbon tetrachloride adsorption activity. Surface area is conveniently determined by the low temperature adsorption of nitrogen. Thus, the methylene blue and carbon tetrachloride values provide an indication of the type of adsorption that can be expected from a particular carbon and the surface area value provides an indication of the capacity of the black for the particular type of adsorption expected.

Activated carbon has been produced by treating various types of materials including lignite, coal, bone char, vegetable matter, and other carbonaceous materials with an oxidizing gas at high temperature. Generally, the starting matter is charred by calcining prior to activation at high temperature with steam, carbon dioxide, or air.

In accordance with the invention, it has been found that pelleted or beaded carbon blacks having increased resistance to crushing and increased surface areas can be produced by the addition of a small amount of an arylene sulfide polymer to the pellets.

Accordingly, an object of this invention is to provide pelleted or beaded carbon blacks having improved physical properties.

Another object of this invention is to provide an improved process for pelleting carbon blacks.

A further object of this invention is to provide a high strength substituted activated carbon.

Other aspects, objects, and the several advantages of the invention will be apparent upon a study of the specification and the appended claims.

In accordance with the invention, an arylene sulfide polymer is added to finely divided carbon black prior to or during pelleting including water wet pelleting to produce pellets which are heated at an elevated temperature and for a period of time sufficient to melt and cure the arylene sulfide polymer and produce high strength pellets.

In accordance with another embodiment of the invention, the carbon black pellets containing arylene sulfide polymers are subjected to air and/or steam activation to produce a high strength substitute activated carbon having a surface area of up to about 1,200 square meters/gram. The amount of arylene sulfide polymer added is sufficient to produce pellets containing from 1 to 20 weight percent polymer. It is presently preferred to employ sufficient polymer to form pellets containing 5 to 15 weight percent of the polymer.

In accordance with the invention, any known arylene sulfide polymer can be employed to improve the properties of pelleted carbon blacks. A presently preferred arylene sulfide polymer is polyphenylene sulfide.

A presently preferred arylene sulfide polymer for use in the invention is the type of polymer prepared by Edmonds et al in U.S. Pat. Nos. 3,354,129 and 3,524,835.

According to said patents, arylene sulfide polymers are prepared in high yield by reacting at least one polyhalo-substituted cyclic compound containing unsaturation between adjacent ring atoms and wherein the halogen atoms are attached to ring carbon atoms with an alkali metal sulfide in a polar organic compound at an elevated temperature. Generally the polar organic compound will substantially dissolve both the alkali metal sulfide and the polyhalo-substituted aromatic compound or other compound which may be present.

In accordance with said patent, polyaromatic sulfides of small particle size are produced when selective polyhalo-substituted aromatic compounds are reacted with an alkali metal sulfide in a polar organic solvent at an elevated temperature. The said polyaromatic sulfides of small particle size separate from the reaction mixture in a finely divided form, at least one dimension of the particles usually falling within the range of about 0.5–100 microns. To separate the polyaromatic sulfides in such a finely divided form, the polyaromatic sulfides will have a melting point or softening point above the temperature at which the polymer separates from the solution. The arylene sulfide polymers applicable produced according to Edmonds et al will ordinarily range from liquid polymers at 25°C. to solid polymers melting above about 400°C.

The carbon blacks suitable for pelleting with arylene sulfide polymers according to the invention include thermal blacks, acetylene blacks, furnace blacks, and channel blacks. Although any of the above-noted carbon blacks can be used, furnace blacks known as Philblack E, Philblack O, etc., having surface areas in the range 5 to 200 square meters/gram and a dibutyl phthalate absorption in the range 25 to 160 cc/100 grams, have been found to yield the best results.

To compare the compositions of this invention, the finely divided carbon black is admixed with particulate arylene sulfide polymer and subjected to conditions of pelleting, either dry or wet, by any pelleting means known to one skilled in the art.

Pelleting of carbon black is effected by charging the flocculent or loose black to a pin mixer or pelleter, known in the carbon black pelleting art, and also charging water or aqueous solution to the pelleter. Rotation of the pins on a shaft within the pelleter produces wet pellets. Wet pellets are removed and normally dried in a conventional heated dryer to produce the final pellets of carbon black having a very minor amount of water, e.g., less than about 0.1 weight percent.

The pelleting operation can be carried out in any known pelleting device such as illustrated in U.S. Pat. Nos. 3,018,171, 3,010,005 and 3,493,350 and subjected to the pelleting temperature in the range 60°–210F. The amount of water present when wet pelleting will ordinarily be in the range of about 30 to about 70 weight percent.

The pelleted carbon black containing arylene sulfide polymer can be activated by heating at an elevated temperature in the range 600°–1,000°F. in the presence of an oxidizing gas, e.g., air and/or steam, oxygen, nitrogen oxides, etc. and mixtures thereof. Other gases which contain water vapor and/or air can be employed such as tail gas, furnace vapors and stack gas from carbon black plants. Activation time is dependent upon temperature and this can vary in the range of about 5 minutes to 10 or more hours. In any event, the conditions will be such that the temperature and time of activation will not destroy the arylene sulfide polymer, and will produce rigid carbon black pellets having $N_2SA$ of 600 to 1,200 $m^2/g$.

The method employed for activation can be varied. For example, it can be conducted in a fluidized bed as either a batch or continuous process, in a rotary kiln, in a percolator bed, or the like.

SPECIFIC EXAMPLE

Carbon black was pelleted and activated with air without polyphenylene sulfide added thereto. The table below sets forth a comparison of the conditions and the properties of the resulting activated pelleted carbon black products both with and without the addition of arylene sulfide polymer.

The flocculent or loose black was added to the pin mixer or pelleter along with the addition of water and polyphenylene sulfide polymer. Wet pelleted carbon black was recovered from the pellets and charged to the rotary dryer wherein the pellets were heated, including direct contact with heated air and dried, and activated carbon black pellets were recovered.

TABLE

| | Base Run | Invention Run |
|---|---|---|
| Unpelleted Carbon Black | | |
| $N_2SA$, $m^2/g$ | 86 | 86 |
| DBP, cc/100 g | 70 | 70 |
| Pelleting of the Black | | |
| Wt. % Black | 57 | 57 |
| Wt. % Water | 43 | 43 |
| Polyphenylene Sulfide[1], wt. % of black | 0 | 10 |
| Pelleting Temperature, °F. | 90 | 90 |
| Pelleter, RPM | 315 | 315 |
| DBP, cc/100 g, pelleted | 65 | 65 |
| Dryer — Activator (Batch) | | |
| Temperature, °F. | 750–800 | 750–800 |
| Time, hours | 8 | 8 |
| Air, SCF/min. | 8 | 10 |
| (Air, SCF/No. Black/min.) | 1.6 | 2.0 |
| Final Product | | |
| Size, mesh | 35–60 | 35–60 |
| Final $N_2SA$, $m^2/g$ | 486 | 689 |
| "Crush Strength" | Crumbles | Rigid |

[1]Polyphenylene sulfide melting point about 350°C.

It will be noted from the above comparative data that carbon black pellets having a high crush strength and whose nitrogen surface area ($N_2SA$) was 689 square meters per gram were produced from carbon black pelleted with polyphenylene sulfide. The rigid or mechanically strong high surface area carbon black pellets can be used as an active carbon.

I claim:

1. A process for the production of pelleted carbon black products having high crush strength which comprises:
   a. pelleting finely divided carbon black in the presence of an arylene sulfide polymer in an amount and under conditions of temperature and time sufficient to form carbon black pellets containing from 1 to 20 weight percent of said polymer, and
   b. activating said carbon black pellets containing said polymer by heating in the presence of an oxidizing gas at conditions which will not destroy said polymer but at an elevated temperature and for a period of the time sufficient to melt and cure said polymer and form said high crush strength carbon black pellets.

2. A process according to claim 1 wherein said carbon black pellets containing said polymer are formed in step (a) by wet pelleting in the presence of water and the pellets are dried prior to activating in step (b) which heating is conducted at an elevated temperature and for a period of time sufficient to form an activated carbon substituted product having a surface area in the range 600–1,200 square meters per gram ($N_2SA$).

3. A process according to claim 1 wherein the arylene sulfide polymer is polyphenylene sulfide and the heating in step (b) is effected in the presence of an oxidizing gas at a temperature in the range 600–1,000°F. for a period of time which will not destroy the polyphenylene sulfide.

4. A process according to claim 1 wherein the arylene sulfide polymer is polyphenylene sulfide and the carbon black-polyphenylene sulfide pellets are activated by contacting with air and/or steam at a temperature in the range 600–1,000°F. for a period of time which will not destroy the polyphenylene sulfide but which will produce an activated carbon substitute having a surface area in the range 600–1,200 square meters per gram ($N_2SA$).

5. A process according to claim 1 wherein the pelleting step (a) is conducted with polyphenylene sulfide as the arylene sulfide polymer and water at a temperature in the range 60°–200°F. to form carbon black pellets containing 5–15 weight percent polyphenylene sulfide and the pellets thus formed are heated in step (b) by contacting with air and/or steam at a temperature in the range 600°–1,000°F. for a period of time which will not destroy the polyphenylene sulfide but which produces an activated carbon substitute having a surface area in the range 600–1,200 square meters per gram ($N_2SA$).

6. The process according to claim 2 wherein the oxidizing gas is selected from air, steam, oxygen, and nitrogen oxides and mixtures thereof.

7. An activated pelleted carbon black-arylene sulfide polymer product containing 1 to 20 weight percent arylene sulfide polymer and having a surface area in the range 600–1,200 square meters per gram ($N_2SA$).

8. A product according to claim 7 wherein the arylene sulfide polymer is polyphenylene sulfide and the amount of polyphenylene sulfide present is in the range 5–15 weight percent.

9. A process for increasing the crush strength and surface area of pellets formed from carbon black which comprises:
   a. pelleting finely divided carbon black in the presence of an arylene sulfide polymer to form pellets comprising carbon black and arylene sulfide polymer, and
   b. activating said pellets formed in step (a) comprising carbon black and arylene sulfide polymer by heating in the presence of an oxidizing gas at conditions which will not destroy said polymer but at an elevated temperature and for a period of time sufficient to melt and cure said polymer and form carbon black-arylene sulfide polymer pellets having a high crush strength and a surface area up to about 1,200 square meters per gram ($N_2SA$).

10. A process according to claim 9 wherein said pelleting is carried out in the presence of water and the carbon black-arylene sulfide polymer pellets thus formed are dried prior to activation which activation is carried out under conditions of temperature and time to form an activated carbon substituted product having a surface area in the range 600–1,200 square meters per gram ($N_2SA$).

11. A process according to claim 10 wherein the arylene sulfide polymer is polyphenylene sulfide and the heating in step (b) is effected in the presence of an oxidizing gas at a temperature in the range 600°–1,000 °F.

* * * * *